United States Patent [19]

Nelson

[11] Patent Number: 5,797,171
[45] Date of Patent: Aug. 25, 1998

[54] BUCKLELESS BELT

[76] Inventor: Constantinelli R. Nelson, 7371 Oakmeadows Dr., Worthington, Ohio 43085

[21] Appl. No.: 992,594

[22] Filed: Dec. 17, 1997

[51] Int. Cl.$^6$ ............................................. A44B 12/20
[52] U.S. Cl. ....................... 24/600.5; 24/68 E; 24/580; 2/322
[58] Field of Search ..................... 2/322, 319, 324, 2/338, 339; 24/68 J, 68 E, 580, 601.6, 600.5, 600.6

[56] References Cited

U.S. PATENT DOCUMENTS

| D. 255,061 | 5/1980 | Nichols | D2/380 |
|---|---|---|---|
| 764,999 | 7/1904 | Gallert . | |
| 1,161,640 | 11/1915 | Eklund | 24/374 |
| 1,345,750 | 7/1920 | Beaumont . | |
| 1,653,058 | 12/1927 | Nelson | 24/601.6 |
| 2,430,957 | 11/1947 | Seitz | 2/321 |
| 4,173,794 | 11/1979 | Nichols | 2/322 |
| 4,179,755 | 12/1979 | Clark | 2/322 |
| 5,008,989 | 4/1991 | Wedler et al. | 24/641 |
| 5,156,430 | 10/1992 | Mori | 24/600.6 |
| 5,519,893 | 5/1996 | Silver | 2/231 |
| 5,737,809 | 4/1998 | Driver | 24/600.6 |

*Primary Examiner*—C. D. Crowder
*Assistant Examiner*—Tejash D. Patel
*Attorney, Agent, or Firm*—John V. Stewart

[57] ABSTRACT

A waist belt with a first end having a hook, and a second end having an inner surface with a series of engagement wires. The hook engages one of the wires, and the second end of the belt overlaps the first end, covering and hiding the hook mechanism from the front view. This provides a smooth, fashionable appearance. A spring-loaded sliding lock on the first end of the belt blocks the hook entrance, retaining the engagement wire without reliance on constant belt tension. The hook, loops, and sliding lock are designed for minimal thickness.

5 Claims, 5 Drawing Sheets

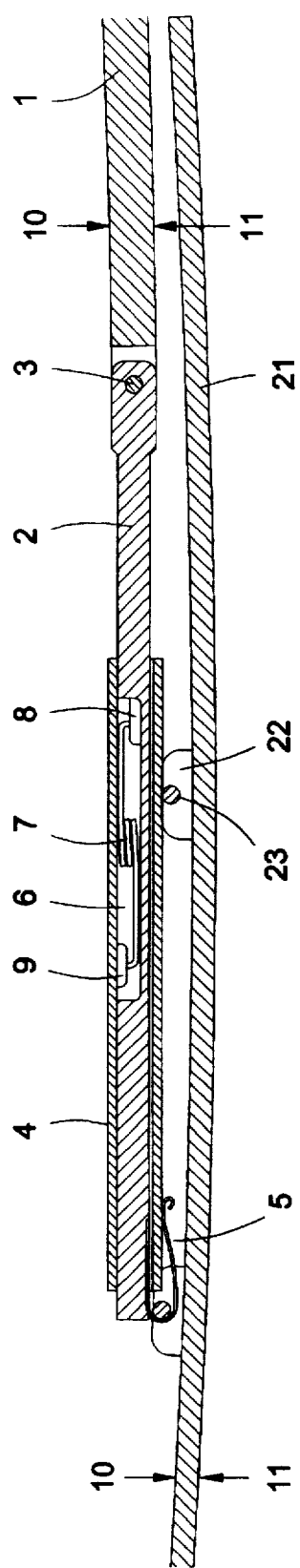

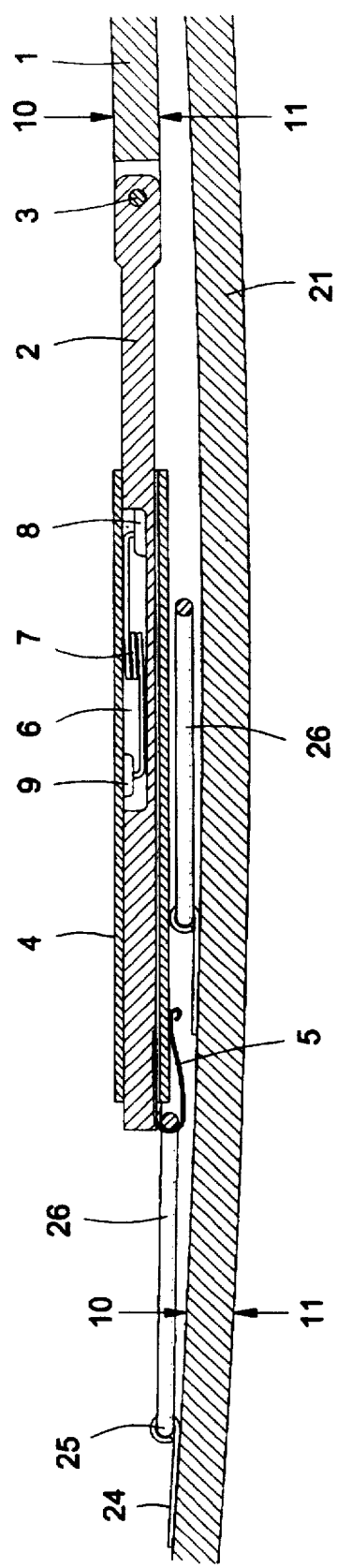

5,797,171

1

BUCKLELESS BELT

BACKGROUND OF THE INVENTION

1. Field of the Invention

This invention is in the field of clothing design, especially waist belts.

2. Description of Prior Art

U.S. Pat. No. 5,519,893 (Silver) discloses an "Invisible Engagement System for a Belt". It has a male engagement member at one end, a plurality of female engagement members on the other end, and a hidden keeper loop which keeps the belt ends aligned. This engagement system requires constant belt tension to retain its engagement.

U.S. Pat. No. 4,179,755 (Clark) discloses a "Belt Without Buckle" having multiple pins (17) with enlarged heads (19) which engage holes (37) in a metal plate (33). Each hole (37) has an enlarged end (39) for receiving the head (37) of a pin, and a reduced end (41) for receiving the neck (21) of the pin. This engagement system relies on constant belt tension to retain its engagement.

U.S. Pat. Nos. 4,173,794 and D255,061 (Nichols) disclose a "Buckleless Belt". When the belt is adjusted to its maximum diameter, the holes (22) on the inner end of the belt are visible from the front. It has a sliding keeper (15) which secures the engagement. However, it can be moved by accidental contact, allowing the belt to disengage.

U.S. Pat. No. 764,999 (Gallert) discloses a "Waist Belt" with a hinged cover flap ($b^2$) for hiding the clasp mechanism. The hinge of the cover flap is visible from the front. This flap is eliminated in the present invention.

SUMMARY OF THE INVENTION

The general objectives of the present invention are to provide a belt with a hidden clasp mechanism that is convenient, secure, thin, and fashionable. A particular objective is provision of locking means for securing the clasp, which does not depend on constant tension of the belt, and is simple to operate.

These objectives are achieved as follows: A belt is provided with a first end having a hook, and a second end having an inner surface with a series of engagement wires. The hook engages one of the wires, and the second end of the belt overlaps the first end, covering and hiding the hook mechanism from the front view. This provides a smooth, fashionable appearance. A spring-loaded sliding lock on the first end of the belt blocks the hook entrance, retaining the engagement wire without reliance on constant belt tension. The hook, loops, and sliding lock are designed for minimal thickness.

2

Figure 8:
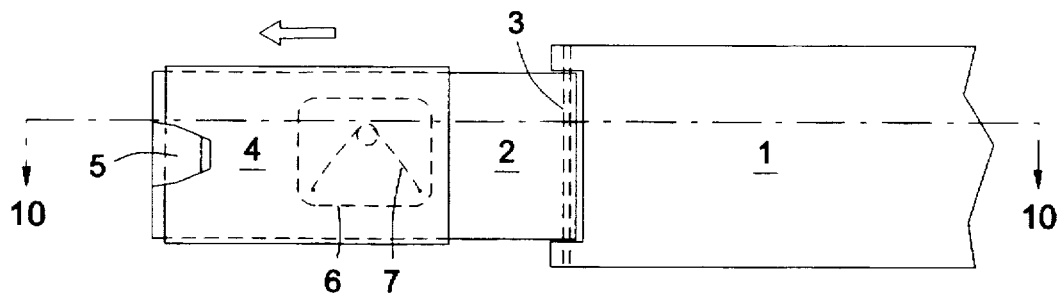

FIG. 8 In a second embodiment, shows a front view of the first end of the belt, with the slide closed.

Figure 9:
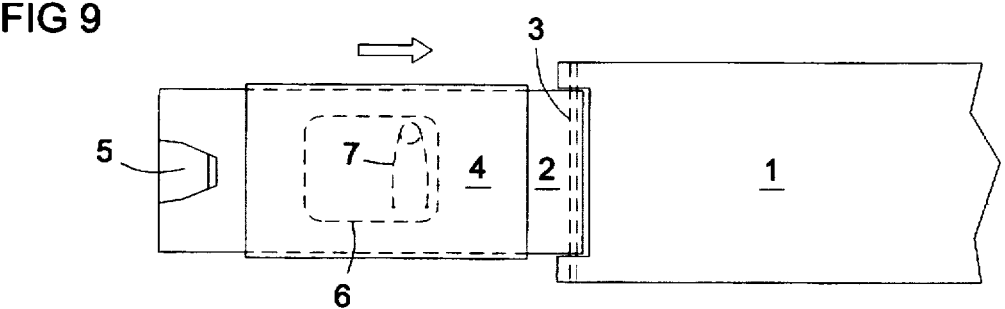

FIG. 9 In the embodiment of FIG. 8, shows a front view of the first end of the belt, with the slide open.

Figure 10:
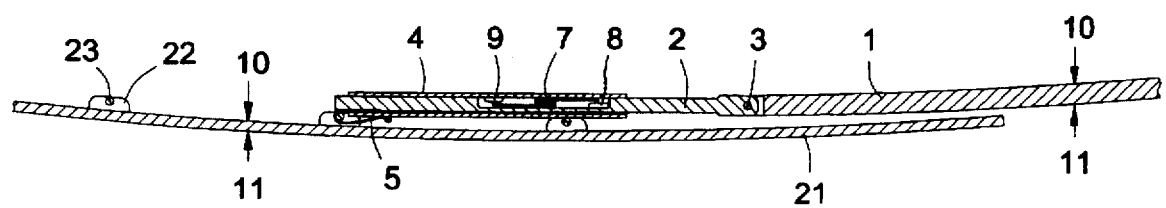

FIG. 10 In the embodiment of FIG. 8, shows a top sectional view of the engaged ends of the belt.

Figure 11:
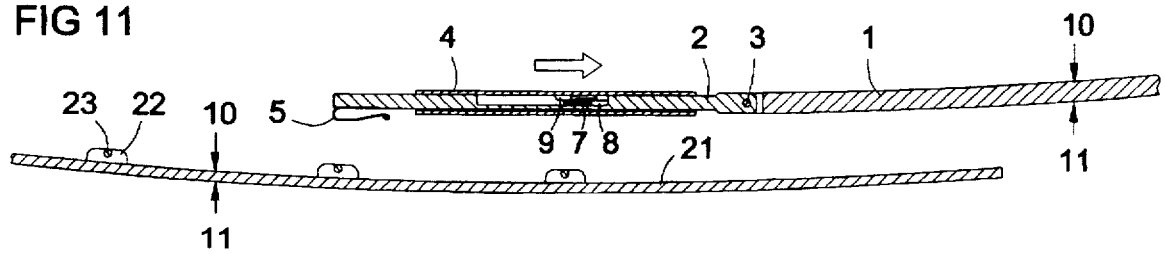

FIG. 11 In the embodiment of FIG. 8, shows a top sectional view of the released ends of the belt.

FIG. 12 In the embodiment of FIG. 8, shows an enlarged top sectional view of the engaged ends of the belt.

FIG. 13 In the embodiment of FIG. 8, shows a back view of the second end of the belt.

FIG. 14 In a third embodiment, shows an enlarged top sectional view of the engaged ends of the belt.

FIG. 15 In the embodiment of FIG. 14, shows a back view of the second end of the belt.

REFERENCE NUMERALS

1. First end of belt or strap
2. Plate
3. Plate pivot pin
4. Slide
5. Hook or catch
6. Spring chamber in plate
7. Spring
8. Boss or tab on plate for retaining spring
9. Boss or tab on slide for retaining spring
10. Inner surface of belt
11. Outer surface of belt
12. Hook mounting bar
13. Inner surface of plate
21. Second end of belt or strap
22. Mounting pad for straight engagement wire
23. Straight engagement wire
24. Mounting base for engagement wire loop
25. Pivot journal of engagement wire loop
26. Pivoting engagement wire loop

DESCRIPTION OF THE PREFERRED EMBODIMENTS

Figure 1:
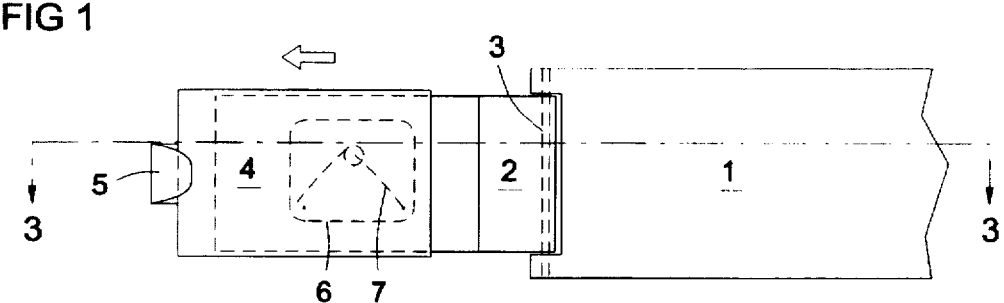
FIG. 1 Shows a front view of the first end of the belt with the slide closed.
Figure 2:
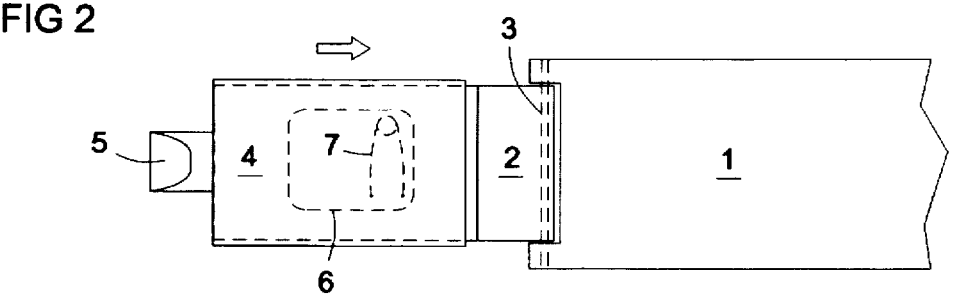
FIG. 2 Shows a front view of the first end of the belt with the slide open.
Figure 3:
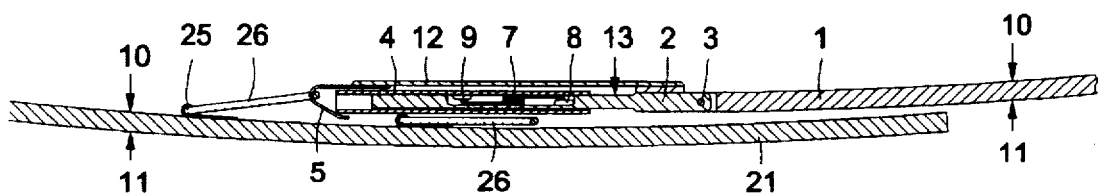
FIG. 3 Shows a top sectional view of the engaged ends of the belt.
Figure 4:
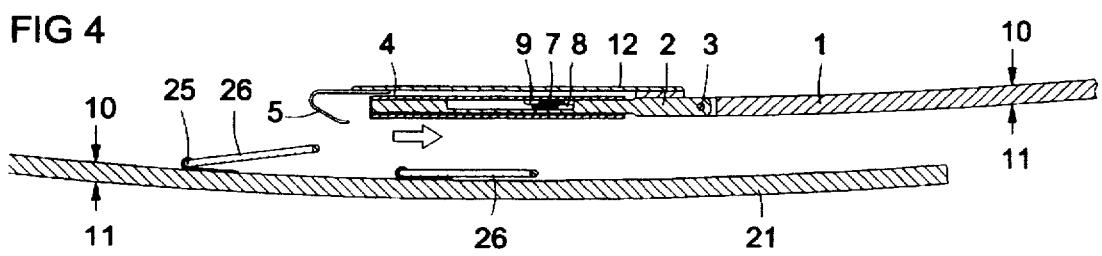
FIG. 4 Shows a top sectional view of the released ends of the belt.
Figure 5:
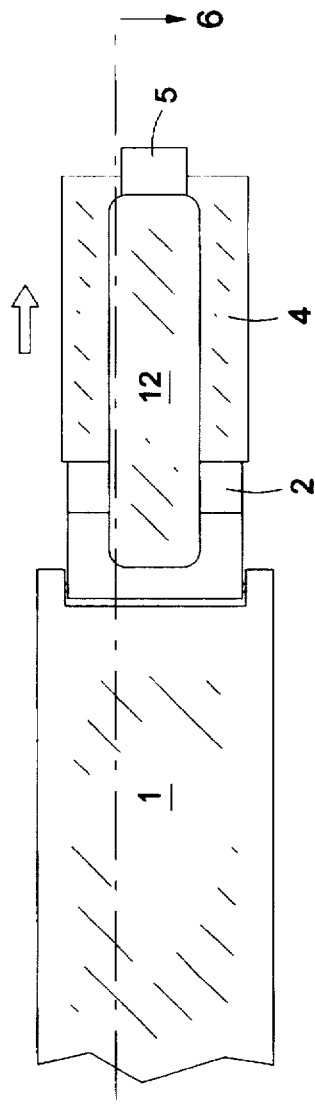
FIG. 5 Shows a back view of the first end of the belt.
Figure 6:
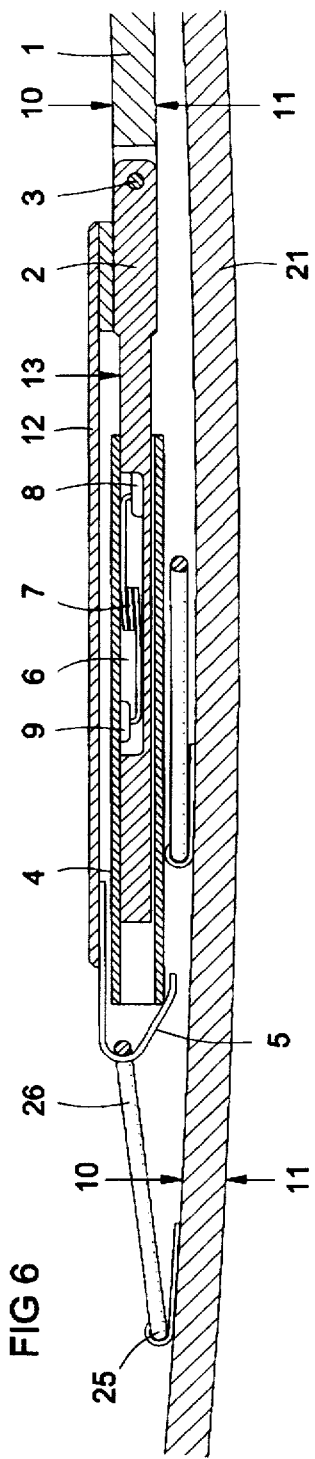
FIG. 6 Shows an enlarged top sectional view of the engaged ends of the belt.
Figure 7:
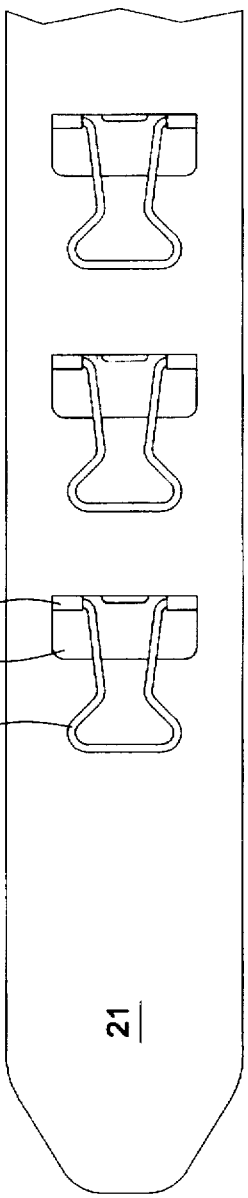
FIG. 7 Shows a back view of the second end of the belt.

FIG. 1 shows a first end (1) of a waist belt from the front view. A plate (2) is attached to the belt, preferably by a pivot pin (3). A hook (5) is attached to the plate for engaging the second end of the belt. The plate has a spring-loaded slide (4) which blocks the entrance of the hook to secure its engagement, as later described. The slide is manually slidable on the plate over a range sufficient to unblock the hook, as shown in FIG. 2. In this position, the hook accepts or releases an engagement wire on the second end of the belt (21), as shown in FIGS. 3 and 4.

A spring (7) acts between the plate (2) and the slide (4), urging the slide toward the hook (5). The user manually pulls the slide away from the hook for engagement or disengagement of the two ends of the belt. While the user is wearing the belt, the slide blocks the hook entrance, preventing release of the engagement wire (26). The spring is preferably a helical torsion spring, mounted inside a chamber (6) in the plate, as shown. One end of the spring is retained by a boss or tab (8) on the plate, and the other end of the spring is retained by a boss or tab (9) on the slide. Other spring types may be used.

Near the second end of the belt (21), on its inner surface (10), is attached a series of engagement wires. These are attached at sufficient distance from the second end of the belt such that the second end of the belt covers and hides the plate (2) from frontal view when the belt ends are engaged. The engagement wires are shown in three different forms. In the preferred form of FIGS. 3, 4, 6, and 7, the engagement wires are formed as loops (26) which pivot on mounting bases (24) to provide separation from the belt surface when needed—otherwise laying flat against it. Other engagement wire forms may be used.

A second embodiment of the invention, FIGS. 8–13, has straight wire segments (23) attached to the belt via a mounting pad (22) at each end of each segment. The pads (22) hold the wire at sufficient distance from the belt surface for the hook (5) to slip between the wire and the belt surface for engagement or disengagement. A third embodiment of the invention is shown in FIGS. 14 and 15. It combines features of the first two embodiments, with additional modification in the shape and arrangement of the engagement wires.

The second and third embodiments also differ from the first embodiment in the attachment of the hook (5). In the first (preferred) embodiment, the hook is attached to a hook mounting bar (12), which crosses behind the slide (2). This insulates the slide from the motion and pressure of a wearer's clothing and body under the belt. The hook mounting bar is anchored to the plate near its attachment with the belt. In the second and third embodiments, the hook is attached directly to the end of the mounting plate (2), with no separate mounting bar.

The first end of the belt may optionally have a fixed loop for retaining the tip of the second end of the belt. Otherwise, the nearest belt loop of the clothing can serve this purpose. For maximum fashion impact the belt may be made of a material that holds its shape sufficiently to remain close against the first end of the belt without any belt loop. Stiff belt leather is sufficient for this purpose.

The present invention is especially intended for use in the waist belt of clothing on a person. However, its use is not a limitation. It can be used for other purposes, including, but not limited to, clothing accessories, hand bags, and the like.

Although the present invention has been described herein with respect to preferred embodiments, it will be understood that the foregoing description is intended to be illustrative, not restrictive. Modifications of the present invention will occur to those skilled in the art. All such modifications which fall within the scope of the appended claims are intended to be within the scope and spirit of the present invention.

I claim:

1. A buckleless belt, comprising:
   a belt having a first end, a second end, and an inner surface;
   a plate having a first end and a second end, the first end of the plate attached to the first end of the belt;
   a hook attached to the plate, the hook having an entrance;
   a slide mounted on the plate, slidable into a first position that blocks the entrance of the hook, and slidable into a second position that unblocks the entrance of the hook;
   a spring acting between the plate and the slide to urge the slide into the first position thereof that blocks the entrance of the hook; and,
   at least one engagement wire mounted on the inner surface of the belt near the second end of the belt for engagement with the hook, the wire mounted at sufficient distance from the second end of the belt so that the second end of the belt covers and hides the plate from frontal view when the wire is engaged in the hook;
   whereby the belt can be closed into a loop having no visible buckle by moving the slide to its second position to unblock the hook, engaging the wire in the hook, and releasing the slide to its first position where it retains the wire in the hook.

2. The belt of claim 1, wherein each engagement wire is formed as a loop which is pivotally attached to the inner surface of the belt by a mounting plate, allowing the loop to pivot away from the belt as needed for the hook to slip between the wire and the belt, and otherwise to lay flat against the belt.

3. The belt of claim 1, wherein each engagement wire is a straight wire segment having two ends, each end attached to the inner surface of the belt via a mounting pad which holds the wire off the surface of the belt sufficiently for the hook to slip between the wire and the belt.

4. The belt of claim 1, wherein the hook is attached to the plate via a mounting bar, said mounting bar having a first end and a second end, the first end of the mounting bar attached to the first end of the plate, the mounting bar crossing behind the slide, and the second end of the mounting bar holding the hook.

5. A buckleless belt comprising:
   a strap of semi-flexible material, having a first end, a second end, and an inner surface;
   a plate having a first end, a second end, and an inner surface, the first end of the plate attached to the first end of the strap;
   a slide mounted on the plate for slidable movement along a line between the first and second ends of the plate;
   a catch having a first end, a second end, and a middle portion, the first end of the catch attached to the inner surface of the first end of the plate, the middle portion of the catch spanning the inner surface of the plate at a clearance therefrom, and the second end of the catch curving around the second end of the plate to form a substantially "J" shaped hook with an entrance therein;
   at least one engagement wire on the inner surface of the second end of the strap for engagement with the hook; and
   said slide movable between a first position which blocks the entrance of the hook, and a second position which clears the entrance of the hook;
   whereby the two ends of the strap can be clasped together by moving the slide to the second position thereof to clear the entrance of the hook, inserting the engagement wire in the hook, and moving the slide to the first position thereof to block the entrance of the hook.

* * * * *